United States Patent Office 2,997,561
Patented Aug. 22, 1961

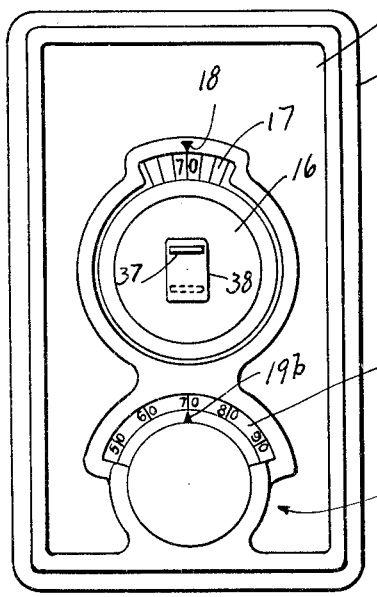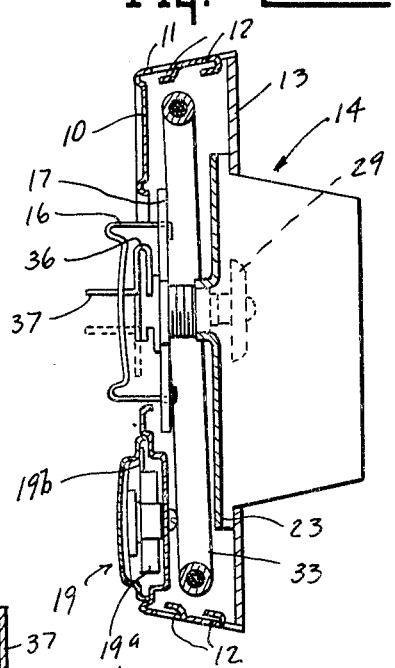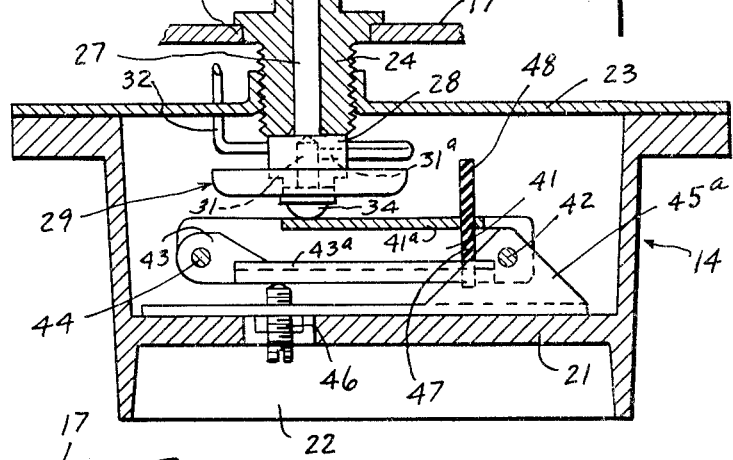

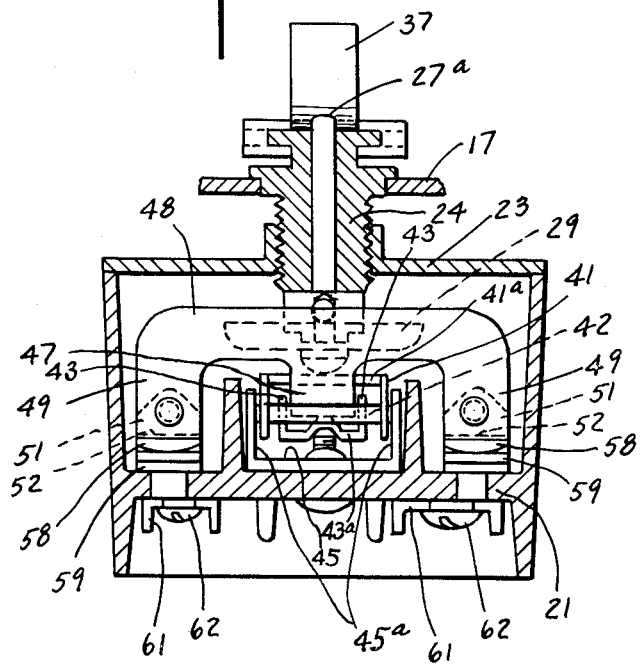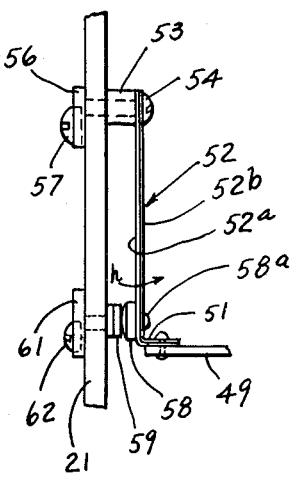

2,997,561
THERMOSTAT
Louis J. Siri, South Bend, Ind., assignor to Penn Controls, Inc., Goshen, Ind., a corporation
Filed Nov. 3, 1958, Ser. No. 771,414
6 Claims. (Cl. 200—140)

This invention relates generally to thermally responsive switching devices and particularly to liquid expansion operated switching devices adapted for control of electric radiant heat.

In maintaining the temperature of a room or other enclosure, one difficulty involved is that of overshoot of the temperature. Thus, when the controlling thermostat reaches its control point and opens its contacts to shut down the heating means, thermal inertia, or "flywheel" effect permits the temperature of the room to continue to rise. This problem is particularly aggravated in the case of radiant heating where the heat source is electric heating elements imbedded in the room walls. In the past, various means have been utilized for meeting this problem, one such being the cycling type of control disclosed in U.S. Patent 2,246,186 to David C. Prince. These attempts to provide a cycling action in a control thermostat have usually involved the use of auxiliary cycling motors and relatively complicated linkage mechanism.

It is an object of the present invention to provide a thermally responsive switching device or thermostat which is actuated by a liquid expansion power element and which incorporates a cycling action of its contacts within the operating differential of the thermostat.

A further object of the present invention is to provide a thermostat utilizing contact blades inherently biased to closed position, the blades being formed by stacking or laminating strips of metal having dissimilar thermal expansion characteristics to provide a cycling action within the temperature differential of operation established by a separate liquid expansion power element.

A further object of the present invention is to provide a thermostat operated by a liquid expansion power element and incorporating a simple, readily accessible manually operable device for altering the linkage between the power element and the thermostat contacts whereby the contacts are held in open position independently of the condition of the power element.

The full nature of the invention will be understood from the accompanying drawings and the following description and claims:

FIG. 1 is a front view of a thermostat embodying the present invention.

FIG. 2 is a side view, partially in section, of the apparatus shown in FIG. 1.

FIG. 3 is a sectional view of the apparatus with the contact structure and cover plate omitted.

FIG. 4 is a top view of a portion of the apparatus shown in FIG. 3.

FIG. 5 is an end view of the apparatus shown in FIG. 3, but with the contact structure included.

FIG. 6 is an enlarged, fragmentary view of a portion of the contact structure.

Referring initially to FIGS. 1 and 2, the thermostat apparatus includes a cover plate 10 having rearwardly flanged margins 11. The flanged margin of the cover plate is apertured at 12 to permit air to circulate beneath the cover plate. The cover plate overlies a rear plate 13 which mounts a housing indicated generally at 14.

The front face of the cover plate is centrally apertured to permit the free extension therethrough of an adjusting knob 16. The knob is secured to an indicia plate 17 carrying suitable temperature markings thereon which cooperate with the stationary pointer 18 carried by the cover plate. The lower portion of the cover plate accommodates a thermometer assembly indicated generally at 19. The thermometer assembly forms no part of the present invention and is of a conventional type utilizing a spiral bimetal element 19a and a movable pointer 19b which cooperates with the temperature scale 19c.

Referring now to FIG. 3, the housing 14 may be seen to be formed of an electrical insulating material, such as molded plastic and includes a base 21 which is surrounded by an extending flange 22. A plate 23 closes the top of the housing, and, as may be seen in FIG. 2, is disposed within the space bounded by the cover plate. An appropriate aperture in the plate 23 receives an adjusting member 24 which may be adjustably positioned with relation to the plate 23 by rotation of the knob 16. The adjusting member has a suitably formed shoulder 26 thereon to which is rigidly attached the plate 17.

Slidably extending through a central bore in the adjusting member is the elongated portion 27 of a support member 28. The support member bears against the lower end of the adjusting member 24 and is rigidly secured to a flexible diaphragm element indicated generally at 29. The diaphragm element itself forms no part of the present invention. It is adapted to contain a thermally expansible fluid. The diaphragm forms a part of a liquid expansion system and the interior thereof communicates through the bores 31 and 31a in the support element with the capillary tube 32. The capillary tube has connection with an elongated bulb 33 disposed in the air stream through the cover plate, a sectional half of the bulb being shown in FIG. 2. The diaphragm 29 may be any one of several conventional types or may be of the type disclosed and claimed in my copending application Serial No. 675,209, filed July 30, 1957. The diaphragm assembly includes a thrust pin 34 and the action of the assembly is such that the thrust pin is moved donwardly, as viewed in FIG. 3, whenever the temperature of the liquid within the bulb 33 is raised the required amount.

The upper end of the adjusting member 24 has an enlarged head 24a, the upper and lower surfaces of which receive the fabricated, adjacent ends of a U-shaped manually operable member 36. The tab 37, formed in bifurcating the upper leg of the member 36, is bent to extend outwardly through an aperture 38 (FIG. 1) in the cover member. The curved juncture of tab 37 and the adjacent leg of the member 36 cooperates with the protruding end 27a of the portion 27 so that, as the member 36 is moved leftwardly in FIG. 3, the support member 28 and consequently the diaphragm element 29 will be moved downwardly with relation to the adjusting member 24.

The lever system linking the thrust pin 34 to the switch structure will now be described with reference to FIGS. 3 and 5. The compound lever system includes a primary lever 41 having a central horizontal portion 41a and having its depending sides pivotally supported by means of a pin within upwardly extending ears 45a of a plate 45 rigidly secured to the inner face of the housing base 21. The horizontal portion 41a of the primary lever is engaged by the thrust pin 34, and the free end of the primary lever has pivoted thereto a secondary lever 43 by means of the pin 44 (FIG. 3). The intermediate portion 43a of the secondary lever engages the inner end of a calibrating screw 46 which is threaded through the base 21 and has its head accessible at the outer face thereof. The free end of the secondary lever 43 engages a depending portion 47 of a switch actuating yoke 48. The yoke 48 has spaced depending legs 49 which may be seen in FIG. 5. The yoke is formed of a suitable electrical insulating material and, as may be seen in FIG. 5, each of the legs is riveted to the upstanding ends 51 of contact blades 52.

As may best be seen in FIG. 6, each of the contact assemblies thereby provided includes a blade 52 rigidly supported on a spacer 53 by means of a screw 54 which extends through the spacer and is threaded into a contact lug 56 disposed on the outer face of the base 21. The lug 56 accommodates a terminal screw 57 which is accessible for the connection of electrical wiring. The opposite ends of the blades 52 carry movable contacts 58 which cooperate with fixed contacts 59, supported on the base 21 and having electrical connection to the lugs 61 and terminal screws 62. The contact blades are mounted so that they inherently bias the contacts 58 and 59 into engaged or closed position.

The contact blades themselves are formed of laminated strips of material, such as Phosphor bronze indicated at 52a and spring steel indicated at 52b. As is well known, the material indicated at 52a has a higher thermal coefficient of expansion than the material 52b, causing the blade to move in the direction indicated in FIG. 6 upon an increase in blade temperature. While the blades might possibly be formed of conventional bimetal material, in the preferred structure herein shown, the two portions 52a and 52b of the blade are not attached to each other except at the screw 54 and the movable contact rivet 58a.

In operation, with the temperature of the room or enclosure in which the thermostat is located at a value below the cut-out setting of the thermostat, the inherent resiliency of the blades 52 will maintain the contacts 58 and 59 closed. During this time, since the electrical circuit through the contacts includes the blades 52, these blades will be heated by the current therethrough to provide a cyclic disengagement and engagement of the contacts. The time period for this cycling varies with the size of the blades 52, but in the preferred form the cycles are of approximately thirty seconds duration. This cycling of the contacts provides an intermittent energization of the heating means for the room, such as electrical heaters, and reduces the tendency for the temperature to overshoot the desired value.

As the temperature in the room increases, the diaphragm element 29 moves thrust pin 34 downwardly, as viewed in FIG. 3, to move the primary lever 41 counter-clockwise about its pivot 42. This movement causes the secondary lever 43 to engage the screw 46, thereby moving the free end of the secondary lever 43 upwardly, as viewed in FIG. 3. When the temperature of the room reaches the cut-out setting of the thermostat, the upward force exerted by the secondary lever 43 on the yoke 48 will be sufficient to move the contact blades 52 sufficiently to separate the contacts 58 and 59. It may thus be seen that the linkage between the diaphragm and the switch blades is such that the contacts are positively moved to open position by the diaphragm element. Thus, at temperature values above the upper end of operating differential of the thermostat, the action of the diaphragm element overpowers the cycling action produced by the contact blades. As the room temperature again decreases, the thrust pin 34 will be moved upwardly, as viewed in FIG. 3, and the inherent biasing force exerted by blades 52 will move the contacts to closed position and will cause the portion 41a of the primary lever 41 to follow the upward movement of the thrust pin. As soon as the contacts again close, the cycling action produced by the blades 52 will again be initiated.

Manually opening the contacts independently of the adjusted position of the member 24 may be accomplished by moving the tab 37 over and past the protruding end 27a of the support member 28. This movement of the element 36 displaces downwardly, as viewed in FIG. 3, the diaphragm element, causing its thrust pin to actuate the lever system to move the contacts 58 and 59 into open position. It should be noted that while the position of adjusting member 24 with relation to plate 23 determines the cut-out setting of the thermostat, actuation of the tab 37 to its broken line position of FIG. 1 functions to open the contacts independently of the cut-out point adjustment.

From the foregoing, it will be evident that the one-way connection between the diaphragm element and the contacts permits the contacts to cycle between open and closed position at temperatures below the cut-out setting of the thermostat. The stepped approach to the desired temperature thereby accomplished tends to prevent temperature overshoot. The mounting for the temperature element, whereby the element is movable with relation to the adjusting member provides a convenient means for manually moving the contacts to off position without changing the setting made by the knob 16.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A thermally responsive switching device adapted to control an enclosure heating means in response to the temperature of the enclosure, said device including a base and a plate mounted in spaced overlying relation to the base, fixed and movable cooperating contacts supported on said base, biasing means urging said contacts into closed position, lever means pivotally supported between said base and said overlying plate, a motion transmitting member extending between said lever means and said movable contact and adapted to open said contacts as said lever means moves in one direction and to permit said contacts to close when said lever means moves in another direction, temperature responsive actuating means for said lever means, said actuating means comprising an adjusting member threaded into said plate and having an axial aperture therethrough, a fluid filled diaphragm element responsive to the temperature of the enclosure and having a thrust pin engaging said lever means, a support member disposed between said diaphragm element and one end of said adjusting member, said support member including a portion extending freely through said adjusting member aperture and protruding beyond the other end of said adjusting member, a manually operable member mounted for sliding movement across said other end of said adjusting member and engageable with the protruding portion of said support member to thereby displace said support member with relation to said adjusting member, rotation of said adjusting member thereby bodily positioning said diaphragm element to adjust the temperature at which said contacts are opened thereby, and movement of said manually operable member to displace said support member serving to open said contacts independently of the position of said adjusting member.

2. A thermally responsive switching device adapted to control an enclosure heating means in response to the temperature of the enclosure, said device including a plate, fixed and movable cooperating contacts disposed on one side of said plate, biasing means urging said contacts into closed position, lever means pivotally supported on said one side of said plate, a motion transmitting member extending between said lever means and said movable contact and adapted to open said contacts as said lever means moves in one direction and to permit said contacts to close when said lever means moves in another direction, temperature responsive actuating means for said lever means, said actuating means comprising an adjusting member threaded into said plate and having an axial aperture therethrough, a fluid filled diaphragm element responsive to the temperature of the enclosure and having a thrust pin engaging said lever means, a support member disposed between said diaphragm element and one end of said adjusting member, said support member including a portion extending freely through said adjusting member aperture and protruding beyond the other end of said adjusting member, a manually operable member mounted for sliding movement across said other end of said adjusting member and engageable with the protruding portion of said support member to thereby displace said support member with relation to said adjusting member, rotation of said adjusting member thereby bodily positioning said diaphragm element to adjust the temperature at which said contacts are opened thereby, and movement of said manually operable member to displace said support member serving to open said contacts independently of the position of said adjusting member.

3. In a temperature responsive control device, a base, a stationary switch contact mounted on said base, a contact blade supported on said base, a movable switch contact carried by said blade and biased into engagement with said stationary contact by said blade, said blade forming a part of the electrical circuit through said contacts, a temperature responsive element, a one-way motion linkage between said element and said contact blade whereby said element may positively move said blade to contacts open position at a cut-out temperature, said blade being formed of overlying strips of spring steel and Phosphor bronze attached only at their end portions and with said steel strip disposed remotely from said movable contact, said blade having an inherent electrical resistance capable of generating sufficient heat to disengage said contacts whereby the heat generated by the current through said blade drives said movable contact cyclically out of engagement with said fixed contact at temperatures below said cut-out temperature.

4. In a condition responsive control device, a base, a stationary switch contact mounted on said base, a contact blade supported on said base, a movable switch contact carried by said blade and biased into engagement with said stationary contact by said blade, said blade forming a part of the electrical circuit through said contacts, a condition responsive element, a one-way motion linkage between said element and said contact blade whereby said element may positively move said blade to contacts open position at a cut-out temperature, said blade being formed of overlying strips of material having differing coefficients of thermal expansion attached only at their end portions and with the lower coefficient strip disposed remotely from said movable contact, said blade having an inherent electrical resistance capable of generating sufficient heat to disengage said contacts, whereby the heat generated by the current through said blade drives said movable contact cyclically out of engagement with said fixed contact at temperatures below said cut-out temperature.

5. A thermally responsive switching device adapted to control an enclosure heating means in response to the temperature of the enclosure, said device including a plate, fixed and movable cooperating contacts disposed on one side of said plate, biasing means urging said contacts into closed position, unidirectional motion transmitting means supported on said one side of said plate and adapted to open said contacts, temperature responsive actuating means comprising an adjusting member threaded into said plate and having an aperture therethrough, a temperature responsive element responsive to the temperature of the enclosure and having a thrust pin in engagement with said motion transmitting means, said responsive element including a base portion engaging one end of said adjusting member and including a shaft portion slidably supported in said adjusting member aperture and normally protruding beyond the other end of said adjusting member aperture, an auxiliary actuator mounted for engagement with protruding portion of said responsive element shaft portion to thereby disengage said responsive element from said adjusting member, rotation of said adjusting member thereby bodily positioning said responsive element to adjust the temperature at which said contacts are opened thereby whenever said auxiliary actuator is disengaged from said protruding responsive element shaft portion and movement of said auxiliary actuator to engage and thereby depress said protruding responsive element shaft portion for disengaging said responsive element from said adjusting member serving to open said contacts independently of the position of said adjusting member, said auxiliary actuator being normally disengaged from the protruding portion of said responsive element.

6. In a thermally responsive switching device the combination of a switch, a thermostat normally responsive to changes in temperature of an enclosure and capable of actuating said switch, a support member for mounting said switch, an adjusting member threaded into said support member for adjusting the position of said thermostat, said adjusting member having a bore therethrough, a shaft slidably supported in said bore with one end normally protruding from said bore and the other end supporting said thermostat to allow the rotational position of said adjusting member to determine the temperature at whch said thermostat will actuate said switch, and a manually operable member capable of engaging the protruding end of said shaft to depress said shaft into the bore of said adjustment member thereby disengaging said thermostat from said adjusting member and rendering said thermostat incapable of actuating said switch and forcing said switch to remain in one position for all temperatures of said enclosure, said manually operable member being normally disengaged from the protruding end of said shaft.

References Cited in the file of this patent
UNITED STATES PATENTS

| | | |
|---|---|---|
| 1,321,287 | Daly et al. | Nov. 11, 1919 |
| 2,032,041 | Beck | Feb. 25, 1936 |
| 2,325,511 | Heintzen | July 27, 1943 |
| 2,402,354 | Waddell | June 18, 1946 |
| 2,441,192 | Graves | May 11, 1948 |
| 2,465,830 | Anderson | Mar. 29, 1949 |
| 2,475,039 | Lucas | July 5, 1949 |
| 2,822,447 | Garner | Feb. 4, 1958 |